(12) United States Patent
Rambhia

(10) Patent No.: US 11,764,948 B1
(45) Date of Patent: Sep. 19, 2023

(54) CRYPTOGRAPHIC SERVICE INTERFACE

(71) Applicant: Amazon Technologies, Inc., Seattle, WA (US)

(72) Inventor: Avni Harilal Rambhia, Fairfax, VA (US)

(73) Assignee: Amazon Technologies, Inc., Seattle, WA (US)

( * ) Notice: Subject to any disclaimer, the term of this patent is extended or adjusted under 35 U.S.C. 154(b) by 344 days.

(21) Appl. No.: 15/967,419

(22) Filed: Apr. 30, 2018

(51) Int. Cl.
H04L 9/08 (2006.01)
H04L 9/14 (2006.01)

(52) U.S. Cl.
CPC ............ H04L 9/0819 (2013.01); H04L 9/0877 (2013.01); H04L 9/14 (2013.01)

(58) Field of Classification Search
CPC ......... H04L 9/0819; H04L 9/0877; H04L 9/14
See application file for complete search history.

(56) References Cited

U.S. PATENT DOCUMENTS

| | | | | |
|---|---|---|---|---|
| 7,573,876 | B2* | 8/2009 | Lebizay et al. | H04L 29/06 370/392 |
| 8,949,294 | B2* | 2/2015 | Surtani et al. | G06F 16/289 707/812 |
| 9,147,086 | B1* | 9/2015 | Potlapally et al. | G06F 21/64 |
| 9,454,673 | B1* | 9/2016 | Sarukkai et al. | G06F 21/6209 |
| 9,519,696 | B1* | 12/2016 | Roth et al. | G06F 16/258 |
| 9,660,970 | B1* | 5/2017 | Rubin et al. | H04L 9/14 |
| 9,674,312 | B2* | 6/2017 | Kashou et al. | H04L 69/08 |
| 10,313,410 | B2* | 6/2019 | Bullotta et al. | H04L 69/22 |
| 11,079,937 | B2* | 8/2021 | Byers et al. | G06F 3/0659 |
| 2004/0210664 | A1* | 10/2004 | Prendergast | H04L 41/00 709/230 |
| 2007/0274329 | A1* | 11/2007 | Takeyoshi et al. | H04L 63/08 370/401 |
| 2008/0181399 | A1* | 7/2008 | Weise et al. | H04L 9/0877 380/44 |
| 2008/0222244 | A1* | 9/2008 | Huang et al. | H04L 67/28 709/203 |
| 2010/0004763 | A1* | 1/2010 | Murakami et al. | H04L 12/66 700/83 |
| 2010/0064349 | A1* | 3/2010 | Randle et al. | H04L 63/08 726/4 |

(Continued)

OTHER PUBLICATIONS

Schramm et al "A Service Gateway for Networked Sensor Systems", p.66-74, 2004-Published by the IEEE CS and IEEE ComSoc 1536-1268/04 © 2004 (Year: 2004).*

(Continued)

Primary Examiner — Catherine Thiaw
(74) Attorney, Agent, or Firm — Davis Wright Tremaine LLP

(57) ABSTRACT

A cryptography service provides an interface layer between an application and a cryptographic device, such as a hardware security module, trusted platform module, or cryptoprocessor that includes non-exportable tamper-resistant memory. A translation layer is provided between the customer application and the load-balancing service that accepts requests from the client application in a first protocol, such as KMIP, and converts the requests into a second protocol that is compatible with the cryptographic device. Results that are returned from the cryptographic device are translated and returned in accordance with the first protocol. In an embodiment, the cryptographic devices may be arranged in a cluster configuration where each cryptographic device stores a matching set of cryptographic keys, and a load-balancing service acts as an interface to the cluster of cryptographic devices.

20 Claims, 9 Drawing Sheets

(56) References Cited

U.S. PATENT DOCUMENTS

| | | | | |
|---|---|---|---|---|
| 2011/0047610 | A1* | 2/2011 | Mylavarapu et al. | H04L 63/20 726/12 |
| 2012/0136926 | A1* | 5/2012 | Dillon | G06F 16/9574 709/203 |
| 2013/0111053 | A1* | 5/2013 | Perreault et al. | H04L 69/16 709/231 |
| 2013/0173907 | A1* | 7/2013 | Lakshminarayanan et al. | H04L 63/0272 713/153 |
| 2013/0214737 | A1* | 8/2013 | Wu et al. | B60L 53/62 320/109 |
| 2013/0272317 | A1* | 10/2013 | Matsumura | H04L 67/2823 370/467 |
| 2014/0281483 | A1* | 9/2014 | Vigliaturo et al. | H04L 63/0471 713/153 |
| 2015/0134953 | A1* | 5/2015 | Seaborn et al. | G06F 21/602 713/168 |
| 2015/0358312 | A1* | 12/2015 | Kancharla et al. | H04L 63/0823 713/156 |
| 2016/0150043 | A1* | 5/2016 | Petronic et al. | H04L 67/2814 709/220 |
| 2017/0346804 | A1* | 11/2017 | Beecham | H04L 63/083 |
| 2018/0351957 | A1* | 12/2018 | Mott | H04L 63/102 |
| 2019/0028294 | A1* | 1/2019 | Daher et al. | H04L 67/52 |
| 2019/0132127 | A1* | 5/2019 | Birke et al. | H04L 9/0822 |
| 2019/0306022 | A1* | 10/2019 | Shimoga Manjunatha et al. | H04L 47/122 |
| 2019/0370050 | A1* | 12/2019 | Kumar et al. | G06F 12/1063 |

OTHER PUBLICATIONS

Guinard et 2010 "Architecting a Mashable Open World Wide Web of Things", ETH Zurich Research Collection, 2010, 9 pages (Year: 2010).*

* cited by examiner

CRYPTOGRAPHIC SERVICE INTERFACE

BACKGROUND

Cryptography services are an important component of many computing data centers. In some computing data centers, cryptographic services are provided locally using cryptoprocessors or hardware security modules ("HSM"). In other computing data centers cryptographic services may be obtained by accessing a cryptography service hosted by a remote server. Network-based cryptography services may, in many examples, provide scalability, capacity, and cost advantages over what local dedicated resources can provide. In general, applications that use cryptographic services are required to communicate in accordance with a command format and communication protocol specified by the service provider. If a service provider changes the command format or communication protocol associated with a cryptographic service, or if the author of an application changes to a different cryptographic service provider, the author may, in many examples, be required to update the application to match the new command format or communication protocol.

BRIEF DESCRIPTION OF THE DRAWINGS

Various techniques will be described with reference to the drawings, in which.

DETAILED DESCRIPTION

Figure 1:
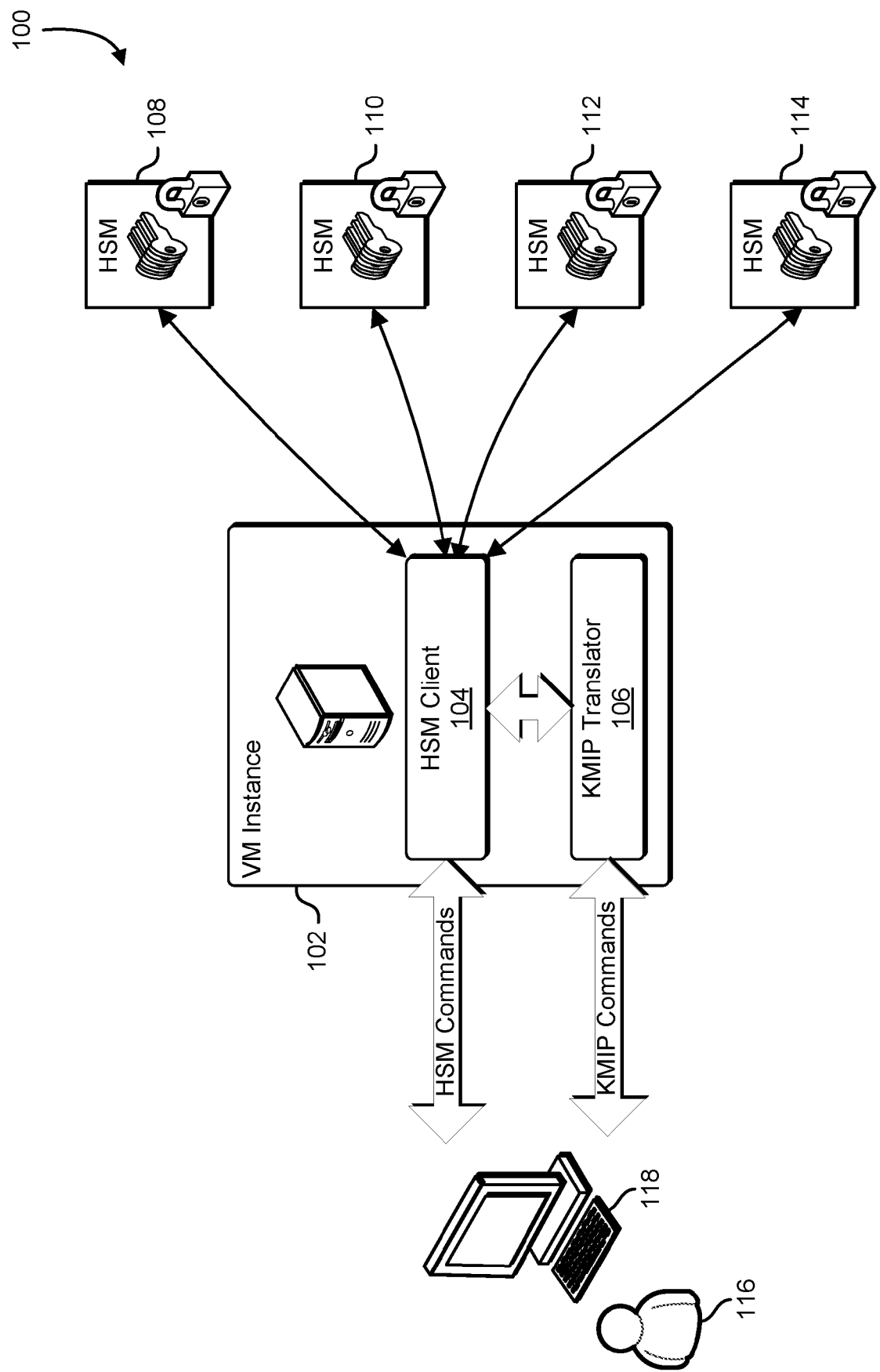
FIG. 1 illustrates an example of an HSM cluster that provides a secondary interface to a client application, in an embodiment.

The present document describes a cryptography service that, in an embodiment, provides a Key Management Interoperability Protocol ("KMIP") interface layer between an application and a cryptographic device, such as a hardware security module. In an embodiment, a computing resource service provider provides access to cryptographic devices as a service. In an embodiment, the cryptographic devices may include devices such as hardware security modules, trusted platform modules ("TPM"), and cryptoprocessors that include non-exportable tamper-resistant memory. In an embodiment, the cryptographic devices are arranged in a cluster configuration where each cryptographic device in a plurality of cryptographic devices is synchronized to contain a matching set of cryptographic keys. In an embodiment, a load-balancing service acts as an interface to the cluster of cryptographic devices, and accepts requests from customer applications to perform cryptographic operations. In an embodiment, the load-balancing service distributes the requests to perform cryptographic operations to individual cryptographic devices to improve the speed and throughput with which requests may be processed.

In an embodiment, a translation layer is provided between the customer application and the load-balancing service. In an embodiment, the translation layer is implemented as a static or dynamic library that implements an application programming interface ("API") to the customer application. In an embodiment, the translation layer is implemented as a service that provides a service interface to the customer application and acts as a client to the load-balancing service. In an embodiment, the translation layer accepts requests from the client application in a KMIP format, and converts the requests into an equivalent set of requests that are compatible with the cryptographic devices serviced by the load-balancing service. In an embodiment, the cryptographic devices are compatible with the Public Key Cryptography Standard #11 ("PKCS11") protocol, and the translation layer translates application requests from the KMIP format into the PKCS11 format. In an embodiment, the translation layer may translate incoming requests to perform cryptographic operations into a format indicated by the load-balancing service. In an embodiment, the translation layer may translate incoming requests into various request formats such as PKCS11, KMIP, CipherTools, AWS CloudHSM Classic, AWS Cloud HSM V2.

In an embodiment, the customer application, the translation layer, and the load-balancing service are hosted on a shared computer system. In an embodiment, the computer system may be a server computer system, server cluster, or virtual computer system instance (also sometimes called a virtual machine ("VM") instance).

In an embodiment, the customer application is hosted on a customer computer system, and the load-balancing service is hosted on another computer system operated by a computing resource service provider. In an embodiment, the translation layer is located on the computer system operated by the computing resource service provider, and acts as a KMIP server to the customer application. In an embodiment, the translation layer provides a network-accessible interface to the customer application such as a representational state transfer ("REST") interface or a simple object access protocol ("SOAP") interface.

In an embodiment, the translation layer is located on the customer computer system. In an embodiment, the translation layer is a static or dynamic library accessible to the customer application and installed on the customer computer system. In an embodiment, the translation layer provides KMIP-compatible application programming interface that is called by the customer application to submit cryptographic requests. In an embodiment, the translation layer processes the cryptographic requests and converts them into a format accepted by the load-balancing service, and submits the converted commands to the load-balancing service. In an embodiment, the commands are received by the load-balancing service, and the load-balancing service forwards the commands to a set of cryptographic devices, such as a cluster of HSMs. In an embodiment, the load-balancing service selects an available HSM from a set of HSMs in an HSM cluster that are capable of fulfilling the request using a round-robin, first available, or random selection scheme.

In an embodiment, results of the cryptographic operation are returned from the cryptographic device to the load-balancing service. In an embodiment, the load-balancing service relays the results to the translation layer. In an embodiment, the translation layer receives the results and converts the results to a format compatible with the KMIP protocol. In an embodiment, the converted results are provided to the customer application.

As one skilled in the art will appreciate in light of this disclosure, certain embodiments may be capable of achieving certain advantages, including some or all of the following: (1) by providing a KMIP interface to customer applications, KMIP-compatible customer applications are able to use the cryptographic devices without modifying the application to be compatible with the cryptographic devices provided by the computing resource service provider, (2) the customer application gains access to the scalable and redundant cryptographic resources of an HSM cluster, and (3) by providing a KMIP translation layer as part of providing access to a set of cryptographic devices, a computing resource service provider is able to increase the number of customer applications that are compatible with the service.

FIG. 1 illustrates an example of an HSM cluster 100 that provides a secondary interface to a client application, in an embodiment. In an embodiment, a VM instance 102 hosts an HSM client 104 and a KMIP translator 106. In an embodiment, the VM instance 102 is a virtual computer system instance created by a computing resource service provider on a computer system operated and managed by the computing resource service provider. In an embodiment, other computer-processing devices may be used in place of the VM instance 102 such as a server computer system, server cluster, network appliance, container runtime, or serverless runtime environment. For example, in an embodiment, the VM instance 102 may be a computer system as described in FIG. 9.

In an embodiment, the HSM client 104 and the KMIP translator 106 are sets of executable instructions stored in a memory associated with the VM instance 102 that, as a result of being executed by a processor of the virtual machine instance 102, cause the VM instance 102 to perform various operations described herein. In an embodiment, the VM instance 102 is a virtual machine, and as such, the operations attributed to the VM instance 102 are performed by an underlying computing device that hosts the VM instance. In an embodiment, it is understood that actions are commonly described in the art as being attributed to software components, layers, or services, and that such actions are performed by computing devices that host the respective software components, layers, or services.

In an embodiment, the HSM client 104 communicates with a set of HSMs. In an embodiment, the set of HSMs includes a first HSM 108, a second HSM 110, a third HSM 112, and a fourth HSM 114. In an embodiment, the set of HSMs is configured as an HSM cluster where each HSM in the cluster stores a matching set of cryptographic keys. In an embodiment, the computing resource service provider maintains synchronization between the individual HSMs in the HSM cluster by updating, adding, and deleting keys from individual HSMs to maintain the consistency of the cryptographic keys across the cluster. In an embodiment, the computing resource service provider monitors the usage of the HSMs and adds and removes individual HSMs from the cluster in response to changes in the number of cryptographic requests submitted to the cluster. In an embodiment, an HSM is a cryptographic device that includes a crypto processor and tamper-resistant memory for the storage of cryptographic keys or information. In an embodiment, the HSM is protected from physical tampering and the tamper-resistant memory contains information that is non-exportable from the device in plaintext form. In an embodiment, the individual HSMs in the set of HSMs are network-connected HSMs, and the HSM client 104 communicates with the set of HSMs via a computer network.

In an embodiment, the HSM client 104 provides load-balancing functionality to the set of HSMs. In an embodiment, the set of HSMs is arranged as a cluster, and the HSM client 104 distributes cryptographic operations to individual HSMs in the cluster. In an embodiment, the HSM client 104 distributes cryptographic operations based at least in part on the availability of each individual HSM in the cluster. In an embodiment, the HSM client 104 distributes cryptographic operations using a round-robin distribution scheme, or a first-available distribution scheme. In an embodiment, the HSM client includes a failover feature that resubmits cryptographic operations to alternative HSMs in the event that an operation previously submitted fails. In an embodiment, the failover feature is configured with a timeout, and if an operation does not complete before the timeout expires, the HSM client 104 submits the failed request to another HSM in the cluster.

In an embodiment, the HSM client 104 provides an interface to the set of HSMs that is accessible to a customer application. In an embodiment, the interface is an application programming interface ("API"), a Web-based interface, a message-based interface, or an object-oriented interface. In an embodiment, the interface may be accessible to the customer application via local calls to procedure entry points, hypertext transfer protocol ("HTTP") requests submitted over computer network, or interprocess messages. In an embodiment, requests received by the HSM client 104 are routed by the load balancer to an individual HSM selected from the set of HSMs, and results provided by the HSM are relayed and returned through the HSM client 104 to the application that submitted the request.

In an embodiment, the KMIP translator 106 makes an additional interface available to customer applications. In an embodiment, the KMIP translator 106 receives requests from a client application in accordance with the KMIP protocol, translates the requests into a form compatible with the set of HSMs, and submits the translated request to the HSM client 104. In an embodiment, the KMIP translator 106 is a software layer positioned between the HSM client 104 and a client application. In an embodiment, the KMIP translator 106 is a service that accepts requests from a customer application, translates the requests, and submits the translated request to the HSM client 104 to the interface described above. In an embodiment, the KMIP translator 106 provides an API, web interface, messaging interface, or procedural interface to the customer application. In an embodiment, translators may be provided that accept cryptographic requests in other formats such as PKCS11 or Java cryptography extension ("JCE") format, and convert such requests into a format accepted by the set of HSMs.

In an embodiment, the VM instance 102 includes additional translation components that convert requests in various formats and in accordance with various submission protocols into a format accepted by the HSM client 104 to be submitted to the set of HSMs. In an embodiment, the additional translation components may be linked to one another to facilitate the translation process. For example, in an embodiment, a first translation component converts from a first cryptographic protocol to a second cryptographic protocol, and the translated request is submitted to a second translation component which converts the translated request into a format accepted by the HSM client 104.

In an embodiment, a translation component such as the KMIP translator 106 may accomplish the translation of cryptographic requests in a variety of ways. In an embodiment, a translation component maintains a table of request equivalents. In an embodiment, the table of request equivalents identifies equivalent request types and request parameter mappings. In an embodiment, when an incoming request arrives at the translation component, the translation component looks up the request in the table to identify an equivalent request that is compatible with the HSM client 104. In an embodiment, parameters of the original request are parsed and extracted and remapped in accordance with a parameter mapping identified in the translation table. In an embodiment, the resulting translated request is transmitted to the HSM client 104. In an embodiment, the translation table may include a plurality of commands that, when executed in sequence by an HSM, are equivalent to the provided request.

In an embodiment, an application controlled by a customer 116 submits cryptographic requests to the set of HSMs. In an embodiment, the application may be hosted on the VM instance 102 or on a client computer system 118. In an embodiment, the requests are submitted from the customer application to the KMIP translator 106. In an embodiment, the customer application also submits cryptographic requests that are compatible with the set of HSMs directly to the HSM client 104. In an embodiment, the client application submits requests to the KMIP translator 106, and the KMIP translator 106 determines whether the request is in a format compatible with the set of HSMs. If the request is in a format compatible with a set of HSMs, the KMIP translator 106 forwards the request to the HSM client 104. If the request is in a format that is not compatible with the set of HSMs, the KMIP translator 106 translates the request into a format compatible with the set of HSMs, and forwards the translated request to the HSM client 104. In an embodiment, a request router on the VM instance 102 receives requests from the customer application and determines the format of the request. In an embodiment, based at least in part on the format of the request, the request router submits the request to either the HSM client 104 or one of a plurality of request translators hosted on the VM instance 102.

Figure 2:
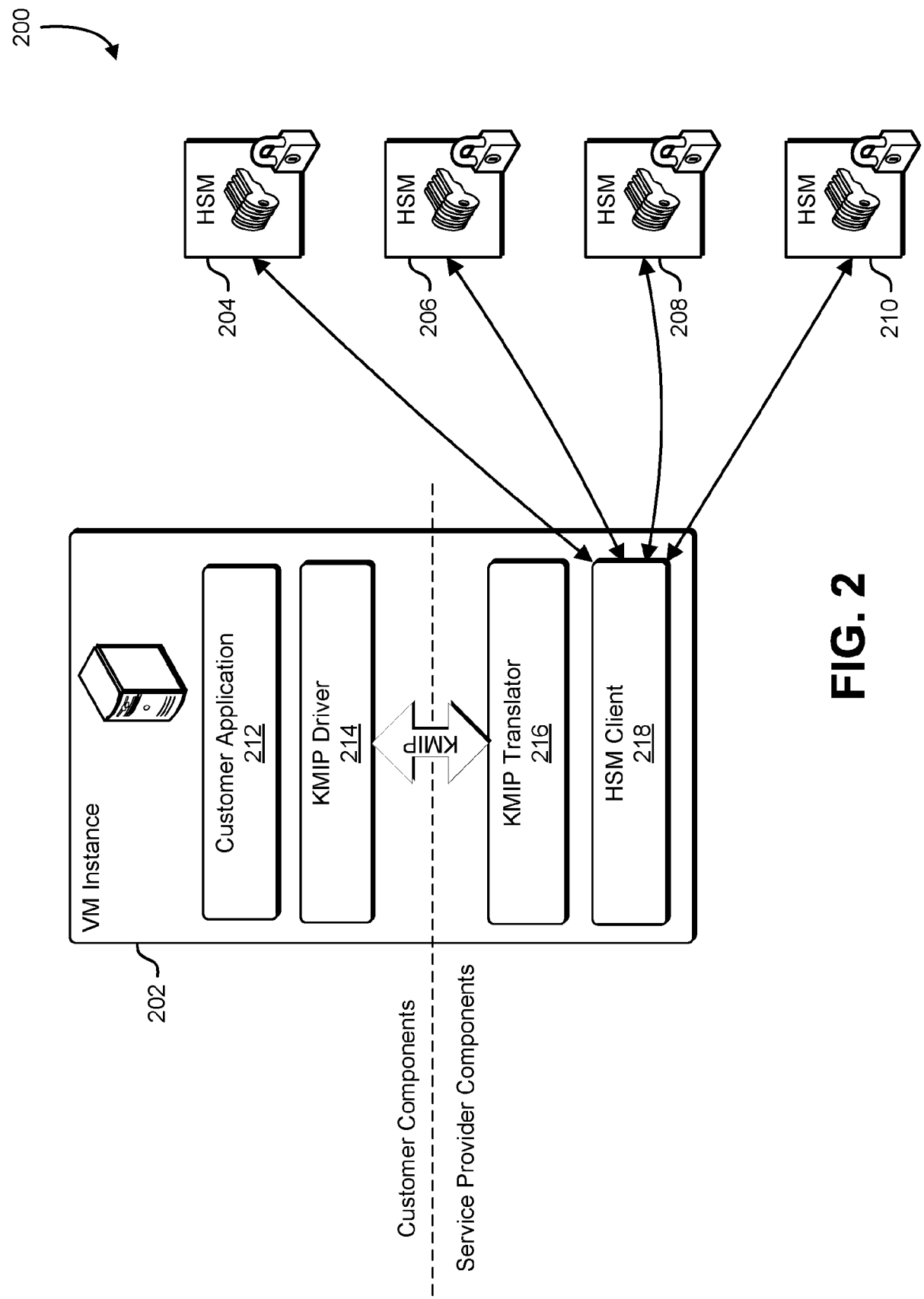
FIG. 2 illustrates an example of an HSM Cluster that provides a secondary interface to a client application hosted on a virtual machine ("VM") instance, in an embodiment.

FIG. 2 illustrates an example of an HSM Cluster 200 that provides a secondary interface to a client application hosted on a virtual machine ("VM") instance, in an embodiment. In an embodiment, a VM instance 202 is connected to a set of HSMs that include a first HSM 204, a second HSM 206, a third HSM 208, and a fourth HSM 210. In an embodiment, the HSMs are arranged as a cluster, and a set of cryptographic keys are synchronized across the HSMs. In an embodiment, other cryptographic devices such as trusted platform modules, crypto processors, and tamper-resistant memory may be used in place of the HSMs. In an embodiment, the HSM cluster provides redundancy and failover capability to the system. In an embodiment, HSMs may be added or removed from the cluster in response to increasing or decreasing demand for cryptographic operations.

In an embodiment, the VM instance 202 hosts a number of customer components and a number of service provider components. In an embodiment, the customer components include a customer application 212 and a KMIP driver 214. In an embodiment, the customer application 212 is a set of executable instructions stored in a memory associated with the VM instance 202 that, as a result of being executed by a processor of the VM instance 202, cause the computer system hosting the VM instance 202 to perform operations specified by the customer. In an embodiment, the operations include cryptographic operations that are performed by the set of HSMs at the request of the customer application 212. In an embodiment, in order to perform a cryptographic operation, the customer application 212 generates a request in accordance with the KMIP protocol using the KMIP driver 214. In an embodiment, the KMIP driver 214 is a static or dynamic library containing procedural entry points that, when called by the customer application 212, cause the VM instance 202 to generate a request to perform a cryptographic operation that conforms to the KMIP protocol.

In an embodiment, the KMIP driver 214 sends the request to a KMIP translator 216. In an embodiment, the KMIP translator 216 converts the request from one that conforms to the KMIP protocol to one that can be accepted by the set of HSMs. In an embodiment, the format of the request is unchanged while the protocol used to transmit the request to the set of HSMs is changed. In an embodiment, the KMIP translator 216 converts the request using a translation table. In an embodiment, the translation table contains a list of cryptographic requests in a first format and a list of corresponding cryptographic requests in a second format. In an embodiment, the table includes information that allows the translator to convert parameters present in a first request into parameters for the translated request. In an embodiment, the information includes parameter ordering information and parameter data type information, and the KMIP translator 216 reorders parameters of incoming requests and converts the data types of the request parameters in accordance with the information in the translation table.

In an embodiment, the KMIP translator 216 is replaced by a multi-protocol translator which accepts requests to perform cryptographic operations in a plurality of formats. In an embodiment, the multiprotocol translator examines incoming requests and determines the format of the request. In an embodiment, the format of the request is determined based at least in part on the network port and protocol used to transmit the request from the customer application to the multiprotocol translator. In an embodiment, the format of the request is determined by examining the substance of the request. In an embodiment, the multiprotocol translator selects a translation table from a collection of translation tables, and uses the information in the selected translation table to convert the request into a format accepted by the set of HSMs.

In an embodiment, the translated request is provided to an HSM client 218. In an embodiment, the HSM client 218 selects a particular HSM from the set of HSMs. In an embodiment, the particular HSM is selected from a subset of HSMs that contain a cryptographic key necessary for fulfilling the request. In an embodiment, the HSM client 218 sends the translated request to the selected HSM, and the selected HSM performs a cryptographic operation to fulfill the request. In an embodiment, the request is an encryption request, a decryption request, a signature-generation request, a signature-validation request, a key generation request, or a key deletion request.

In an embodiment, the selected HSM returns results of the cryptographic operation to the HSM client 218. In an embodiment, the HSM client 218 relays the results to the KMIP translator 216. In an embodiment, the KMIP translator 216 converts the results from the format provided by the selected HSM into a format that is compatible with the KMIP request provided by the customer application 212. In an embodiment, the reformatted results are relayed through the KMIP driver 214 to the customer application 212.

In various embodiments, the system provides the benefit of allowing the customer application 212 to submit requests to perform cryptographic operations in a first protocol, such as KMIP, and have the requests delivered to a cryptographic device that does not support the first protocol. In an embodiment, this allows for legacy customer applications to be used with a greater variety of cryptographic services, and allows the computing resource service provider to modify or update the cryptographic devices used without impacting currently deployed customer applications.

Figure 3:
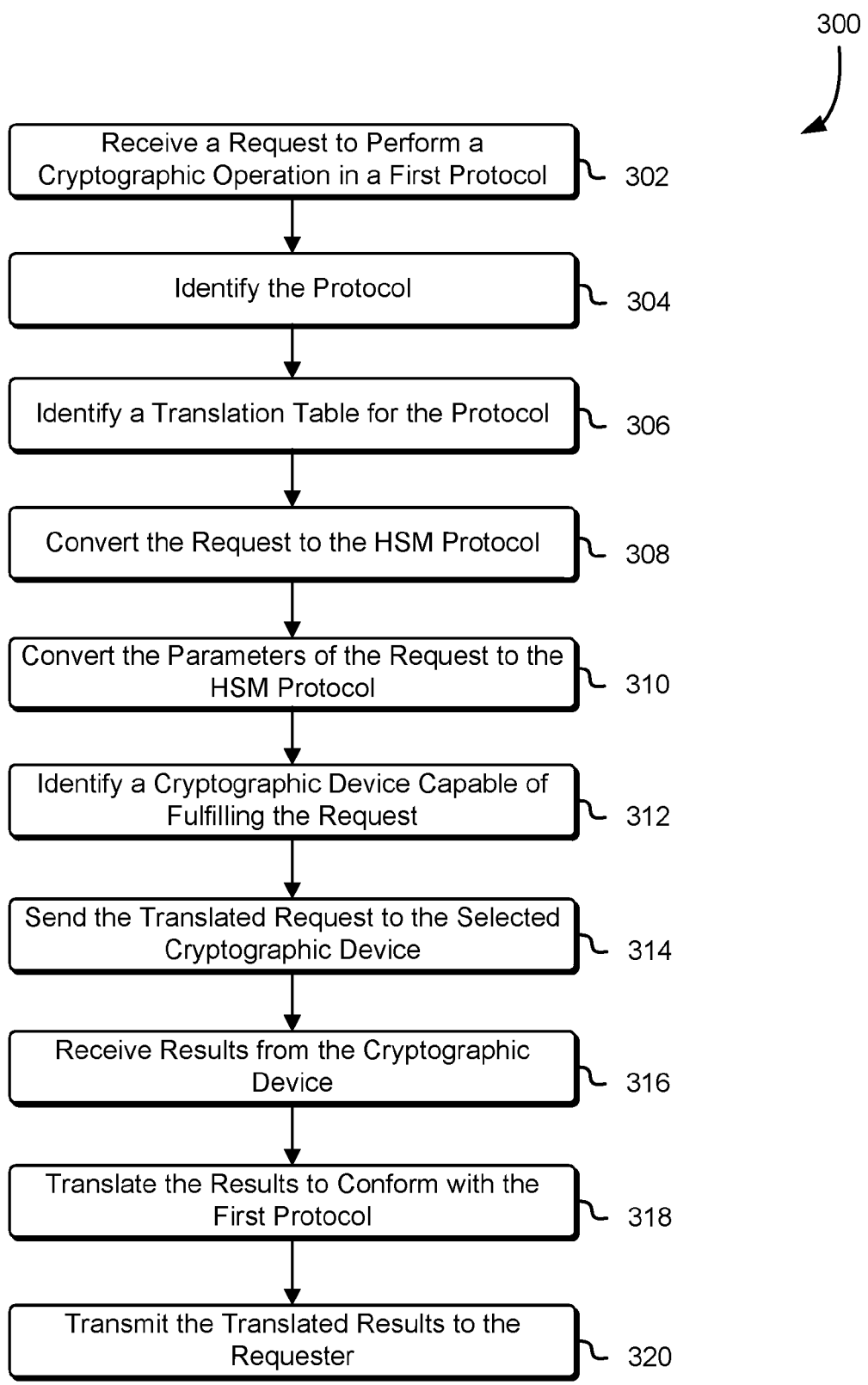
FIG. 3 illustrates a process that, as a result of being performed by a VM instance, fulfills a cryptographic request generated by a customer application, in an embodiment.

FIG. 3 illustrates a process 300 that, as a result of being performed by a computer system hosting a request translator, fulfills a cryptographic request generated by a customer application, in an embodiment. In an embodiment, the process begins at block 302 with the computer system receiving a request to perform a cryptographic operation, where the request is provided in accordance with a first protocol. In an embodiment, the cryptographic operation may be an encryption operation, a decryption operation, a key generation operation, a key rotation operation, a signature generation operation, or a signature verification operation. In an embodiment, the request may include various parameters that are based at least in part on the cryptographic operation requested. For example, in an embodiment, a request to encrypt data includes a parameter that identifies the plaintext data to be encrypted and a parameter that identifies a cryptographic key. In another example, in an embodiment, a request to decrypt data includes a parameter that identifies ciphertext to be decrypted and a parameter that identifies a cryptographic key.

In an embodiment, the request may be provided in accordance with the KMIP, JCE, or PKCS11 protocols. In various embodiments, client-server protocols or local protocols may be used. In an embodiment, at block 304, the computer system identifies the protocol being used to submit the request. In an embodiment, the protocol is identified based at least in part on the communication channel over which the request is submitted. For example, in various embodiments, the request may be submitted over a particular network port, to a particular network address, or via a particular named pipe or mailbox, and the computer system infers the protocol of the request from the communication channel used to receive the request. In an embodiment, the protocol may be identified based on the substance of the request. For example, in various embodiments, the request may include commands or instructions that are specific to a particular request protocol. In some examples, the request itself may identify the protocol of the request in metadata provided with the request.

In an embodiment, at block 306, the computer system identifies a translation table for the identified protocol. In an embodiment, the translation table includes templates for matching incoming requests in the first protocol to equivalent outgoing requests in second protocol supported by the HSM or other cryptographic device. In an embodiment, the templates include parameter maps that allow the computer system to remap parameters of the request from the first protocol to the second protocol. In an embodiment, at block 308, the computer system uses the information in the identified translation table to convert the request to a second protocol supported by the HSMs or other cryptographic devices. In an embodiment, at block 310, the computer system extracts the parameters from the first request and maps the parameters to the second request in accordance with the second protocol. In an embodiment, the parameters may be reordered and the data types of the parameters modified to comply with the second protocol as indicated by the translation table.

In an embodiment, at block 312, the computer system identifies a cryptographic device capable of fulfilling the translated request. In an embodiment, a set of cryptographic devices are arranged as a cluster where each cryptographic device has access to a matching set of cryptographic keys. In an embodiment, the cryptographic device may be an HSM, trusted platform module, crypto processor, or tamper-resistant memory. In an embodiment, the computer system identifies one or more cryptographic keys necessary for fulfilling the translated request, and selects the cryptographic device from a set of cryptographic devices that have access to the necessary cryptographic keys. In an embodiment, the computer system selects a cryptographic device from a set of cryptographic devices based on a processing load or request backlog being processed by each cryptographic device. In an embodiment, the computer system selects a cryptographic device randomly from the set of cryptographic devices. In an embodiment, the computer system selects a cryptographic device by selecting the first available cryptographic device. In an embodiment, at block 314, the computer system sends the translated request to the selected cryptographic device via a computer network, serial connection, USB connection, or other communication channel.

In an embodiment, at block 316, the computer system receives results of the request from the selected cryptographic device. In an embodiment, the request is an encryption request, and the results include an associated ciphertext. In an embodiment, the request is a decryption request, and the results include an associated plaintext. In an embodiment, the request is a signature verification request, and the results include a Boolean value indicating whether the signature is correct. In an embodiment, at block 318, the computer system translates the results to conform to the first protocol using information from the identified translation table. In an embodiment, the translation table includes a result mapping, and the computer system modifies the results accordingly. For example, in an embodiment, if the translation table specifies that the result is a true or false value in the first protocol, and the result is a one or zero value in the second protocol, the computer system converts a return value of one to a value of true, and a return value of zero to a value of false. In an embodiment, at block 320, the computer system transmits the translated results to the requester. In an embodiment, the results are transmitted to the requester by relaying them through the communication channel over which the initial request was received.

Figure 4:
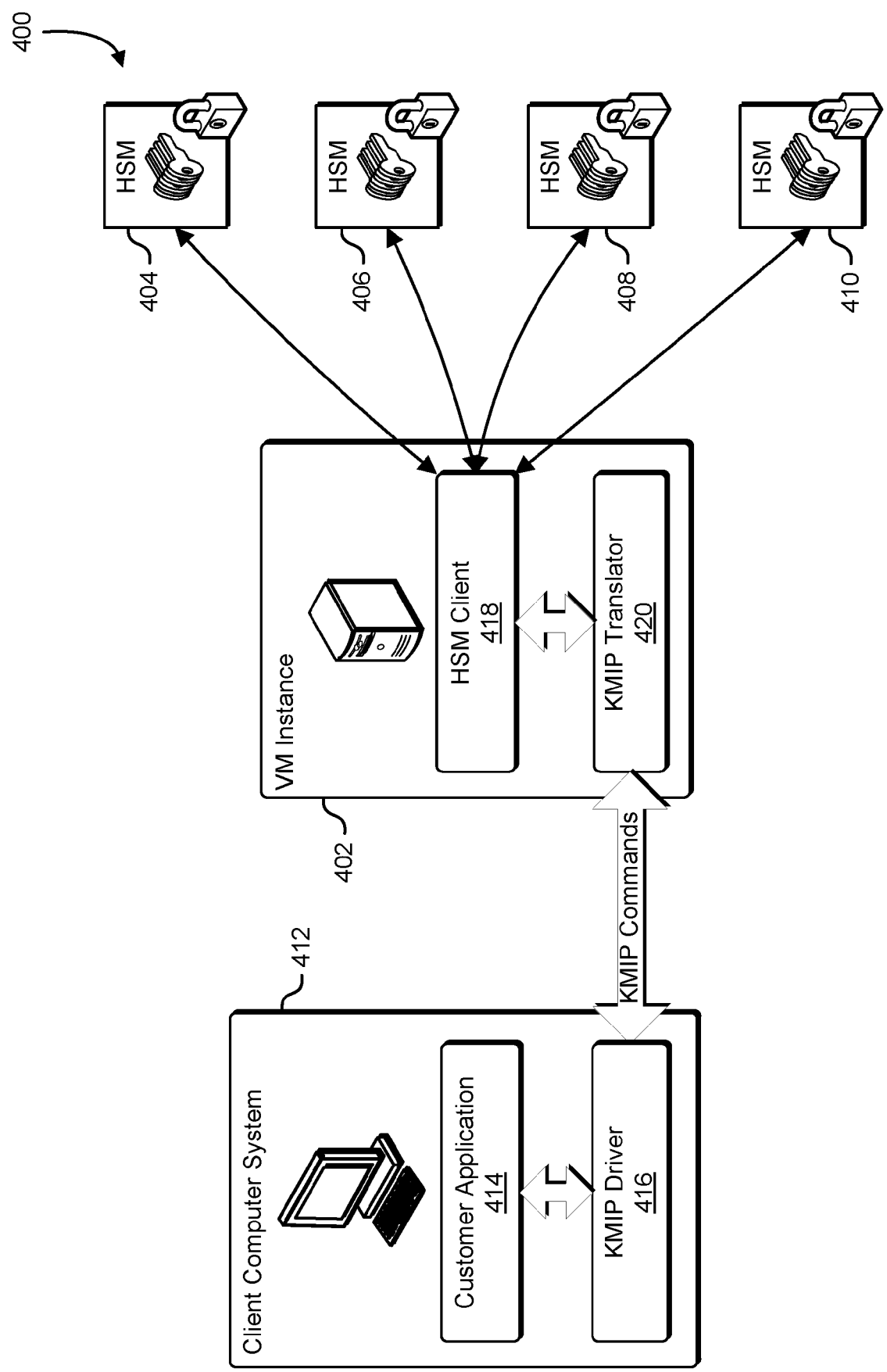
FIG. 4 illustrates an example of an HSM cluster that provides a secondary interface to a client application running on a client computer system, in an embodiment.

FIG. 4 illustrates an example of a system 400 that includes an HSM cluster that provides a secondary interface to a client application running on a client computer system, in an embodiment. In an embodiment, the system includes a VM instance 402 that provides an interface to a set of HSMs arranged in a cluster configuration. In an embodiment, the set of HSMs includes a first HSM 404, a second HSM 406, a third HSM 408, and a fourth HSM 410. In an embodiment, the HSMs may be replaced with other cryptographic devices that are or are not arranged in a cluster configuration as described elsewhere in the present document. In an embodiment, the VM instance 402 provides a primary interface and a secondary interface that are accessible from a client computer system 412 via a computer network.

In an embodiment, the client computer system 412 is a personal computer system, server computer system, server cluster, handheld device, cellular phone, tablet computer system, laptop computer system, wearable device, or network-connected appliance containing a memory with executable instructions that may be executed by a processor on the client computer system 412. In an embodiment, the client computer system 412 hosts a customer application 414 and a KMIP driver 416. In an embodiment, the customer application 414 and the KMIP driver 416 are sets of executable instructions stored in a memory on the client computer system 412 that, as a result of being executed by a processor of the client computer system 412, cause the client computer system to generate a request to perform a cryptographic operation in accordance with the KMIP protocol, and submit the generated request to the set of HSMs. In an embodiment, the customer application 414 identifies a cryptographic operation to be performed such as an encryption operation, a decryption operation, a signature generation operation, a signature verification operation, a key generation operation, or a key deletion operation. In an embodiment, the customer application 414 calls a procedural interface provided by the KMIP driver 416, and the KMIP driver 416 generates a corresponding request in accordance with the KMIP protocol, and transmits the request to the VM instance 402.

In an embodiment, the VM instance 402 hosts an HSM client 418 and a KMIP translator 420. In an embodiment, both the HSM client 418 and the KMIP translator 420 provide independent interfaces to the client computer system 412. In an embodiment, the HSM client 418 provides an interface that accepts requests in the format supported by the set of HSMs. In an embodiment, if a request is received by the HSM client 418, the HSM client 418 forwards the request to one of the HSMs without modification. In an embodiment, the KMIP translator 420 accepts requests in accordance with the KMIP protocol, and translates the incoming requests into the format accepted by the HSM client 418. In an embodiment, the KMIP translator 420 receives the KMIP request from the client computer system 412 and converts the KMIP request into a format compatible with the set of HSMs. In an embodiment, the translated request is forwarded to the HSM client 418, which selects a particular HSM from the set of HSMs, forwards the translated request to the selected HSM, and returns any results to the KMIP translator 420. In an embodiment, the KMIP translator 420 relays any results back to the customer application 414 by way of the KMIP driver 416.

In an embodiment, the customer application 414 submits requests that are in accordance with the KMIP protocol via the KMIP driver 416, and requests that are compatible with the set of HSMs directly to the HSM client 418. In an embodiment, the KMIP driver 416 determines whether the submitted request is in accordance with the KMIP protocol, and routes KMIP compliant requests to the KMIP translator 420 and routes non-KMIP compliant requests to the HSM client 418.

Figure 5:
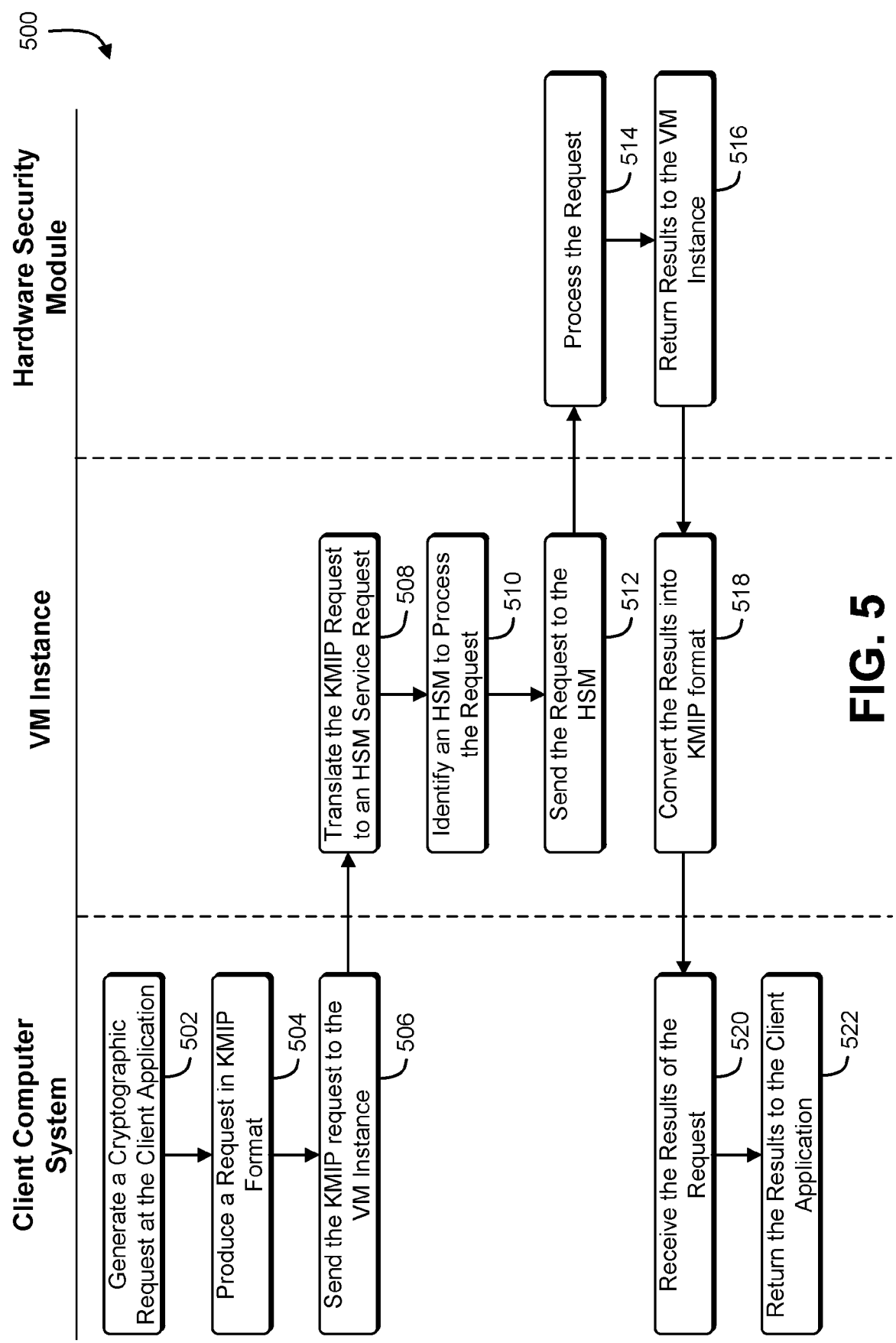
FIG. 5 illustrates a process that, as a result of being performed by a client computer system, a VM instance, and an HSM Cluster, fulfills a cryptographic request generated by a customer application.

FIG. 5 illustrates a process 500 that, as a result of being performed by a client computer system, a VM instance, and an HSM Cluster, fulfills a cryptographic request generated by a customer application. In an embodiment, the process begins at block 502 with a client computer system generating a cryptographic request at the client application. In an embodiment, the cryptographic request is an encryption operation, a decryption operation, a signature generation operation, a signature verification operation, a key generation operation, a key rotation operation, or a key deletion operation. In an embodiment, at block 504, the client computer system formats the request in accordance with the KMIP protocol. In an embodiment, the formatting of the cryptographic request is accomplished by a driver that converts a call to a procedural application programming interface to a request in accordance with the KMIP protocol. In an embodiment, at block 506, the request is transmitted to the VM Instance.

In an embodiment, at block 508, the VM instance receives the request from the client computer system, and translates the request from the KMIP protocol into one that is compatible with the HSM cluster. In an embodiment, the translation converts the request using a translation table. In an embodiment, the translation table includes information that describes equivalent commands and parameter mappings for each command. In an embodiment, at block 510, the VM instance identifies an HSM for processing the request. In an embodiment, the HSM may be identified based on its availability for processing, the presence of particular cryptographic keys in the HSM used to process the request, or a particular capability of the HSM used as part of the cryptographic operation. In an embodiment, at block 512, the VM instance sends the request to the identified HSM. In an embodiment, credentials are provided in addition to the request to authorize access to the HSM.

In an embodiment, at block 514, the hardware security module receives the request from the VM instance, and processes the request. In an embodiment, the request is authorized using credentials provided with the request. In an embodiment, the HSM produces a set of results which, at block 516, are returned to the VM instance. For example, in an embodiment, the request is an encryption request, and the hardware security module returns a ciphertext to the VM instance. In another example, in an embodiment, the request is a decryption request, and the hardware security module returns the plaintext to the VM instance.

In an embodiment, at block 518, the VM instance receives the results from the hardware security module, and converts the results into a format that is compatible with the KMIP request. In an embodiment, converting the results may involve modifying the format, ordering, and transmission characteristics of the results. In an embodiment, converting the results includes identifying a back channel for results information that is associated with the initial request. In an embodiment, the back channel remains open while the request is processing to facilitate the return of the results to the requesting application. In an embodiment, at block 520, the client computer system receives the results of the request from the VM instance, and at block 522, the results are relayed to the client application.

Figure 6:
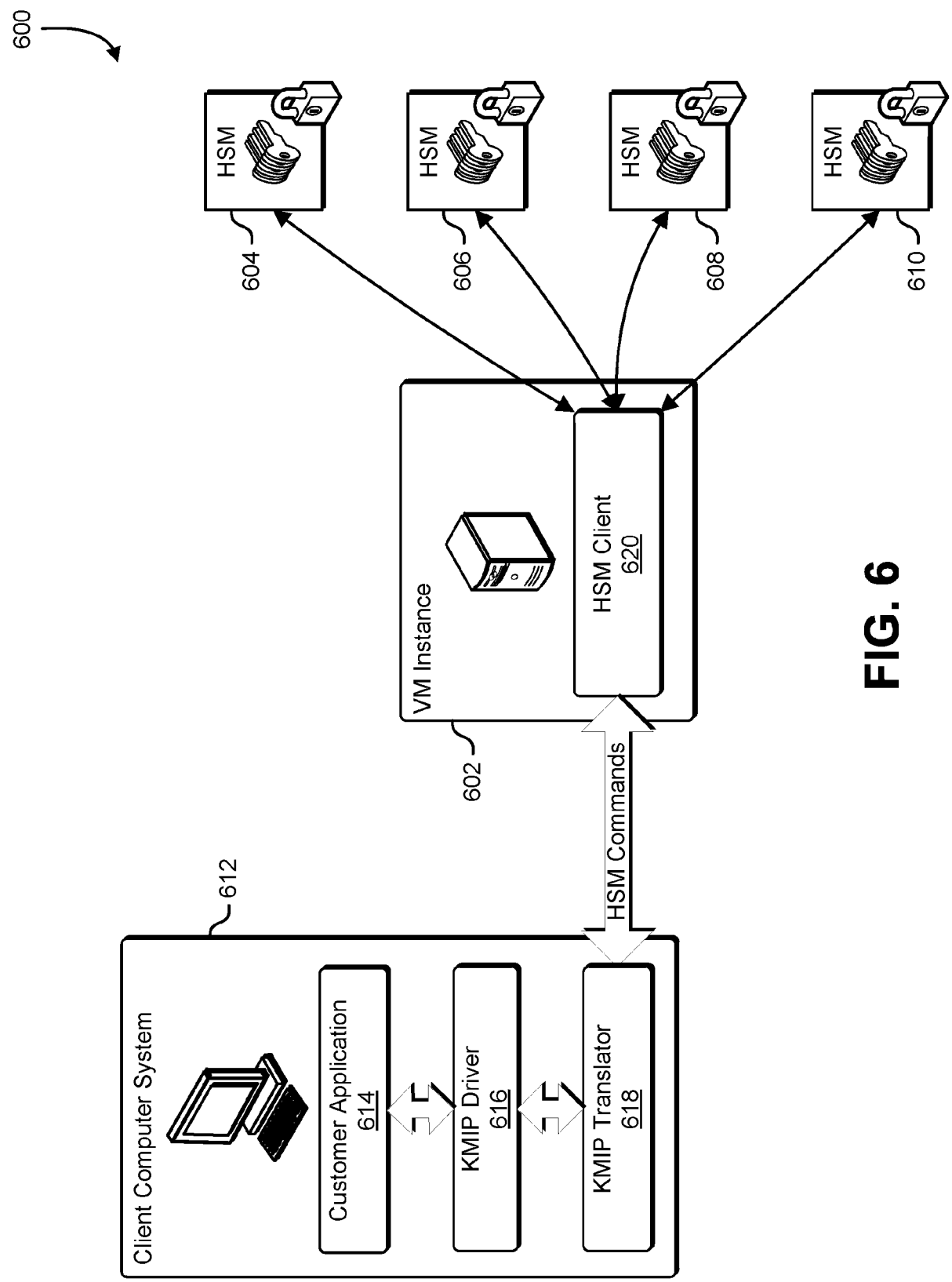
FIG. 6 illustrates an example of an HSM cluster that processes cryptographic requests provided by a Key Management Interoperability Protocol ("KMIP") translator running on a client computer system, in an embodiment.

FIG. 6 illustrates an example of a system 600 that includes an HSM cluster that processes cryptographic requests provided by a KMIP translator running on a client computer system, in an embodiment. In an embodiment, the system includes a VM instance 602 that provides an interface to a set of HSMs arranged in a cluster configuration. In an embodiment, the set of HSMs includes a first HSM 604, a second HSM 606, a third HSM 608, and a fourth HSM 610. In an embodiment, the HSMs may be replaced with other cryptographic devices that may or may not be arranged in a cluster configuration as described elsewhere in the present document. In an embodiment, the VM instance 602 provides a primary interface that is accessible from a client computer system 612 via a computer network. In an embodiment, the primary interface is a PKCS11 interface.

In an embodiment, the client computer system 612 is a personal computer system, server computer system, server cluster, handheld device, cellular phone, tablet computer system, laptop computer system, wearable device, or network-connected appliance containing a memory with executable instructions that may be executed by a processor on the client computer system 612. In an embodiment, the client computer system 612 hosts a customer application 614, a KMIP driver 616, and a KMIP translator 618. In an embodiment, the customer application 614, the KMIP driver 616, and the KMIP translator 618 are sets of executable instructions stored in a memory on the client computer system 612 that, as a result of being executed by a processor of the client computer system 612, cause the client computer system to generate a request to perform a cryptographic operation that is compatible with the set of HSMs, and submit the request to the set of HSMs. In an embodiment, the customer application 614 identifies a cryptographic operation to be performed such as an encryption operation, a decryption operation, a signature generation operation, a signature verification operation, a key generation operation, or a key deletion operation. In an embodiment, the customer application 614 calls a procedural interface provided by the KMIP driver 616, and the KMIP driver 616 generates a corresponding request in accordance with the KMIP protocol, and provides the request to the KMIP translator 618. In an embodiment, the KMIP translator 618 accepts requests in accordance with the KMIP protocol, and translates the incoming requests into the format accepted by the HSM client 620. In an embodiment, the KMIP translator 618 receives the KMIP request from the client computer system 612 and converts the KMIP request into a format compatible with the set of HSMs. In an embodiment, the KMIP translator 618 sends the translated command to the VM instance 602.

In an embodiment, the VM instance 602 hosts an HSM client 620. In an embodiment, the HSM client 620 provides an interface to the set of HSMs to the client computer system 612. In an embodiment, the HSM client 620 provides an interface that accepts requests in the format supported by the set of HSMs. In an embodiment, if a request is received by the HSM client 620, the HSM client 620 forwards the request to one of the HSMs without modification. In an embodiment, the HSM client 620 forwards the translated request to the selected HSM, and returns any results to the KMIP translator 618. In an embodiment, the KMIP translator 618 relays any results back to the customer application 614 by way of the KMIP driver 616. In an embodiment, the customer application 614 generates requests in accordance with the KMIP protocol and the KMIP driver 616 is omitted.

Figure 7:
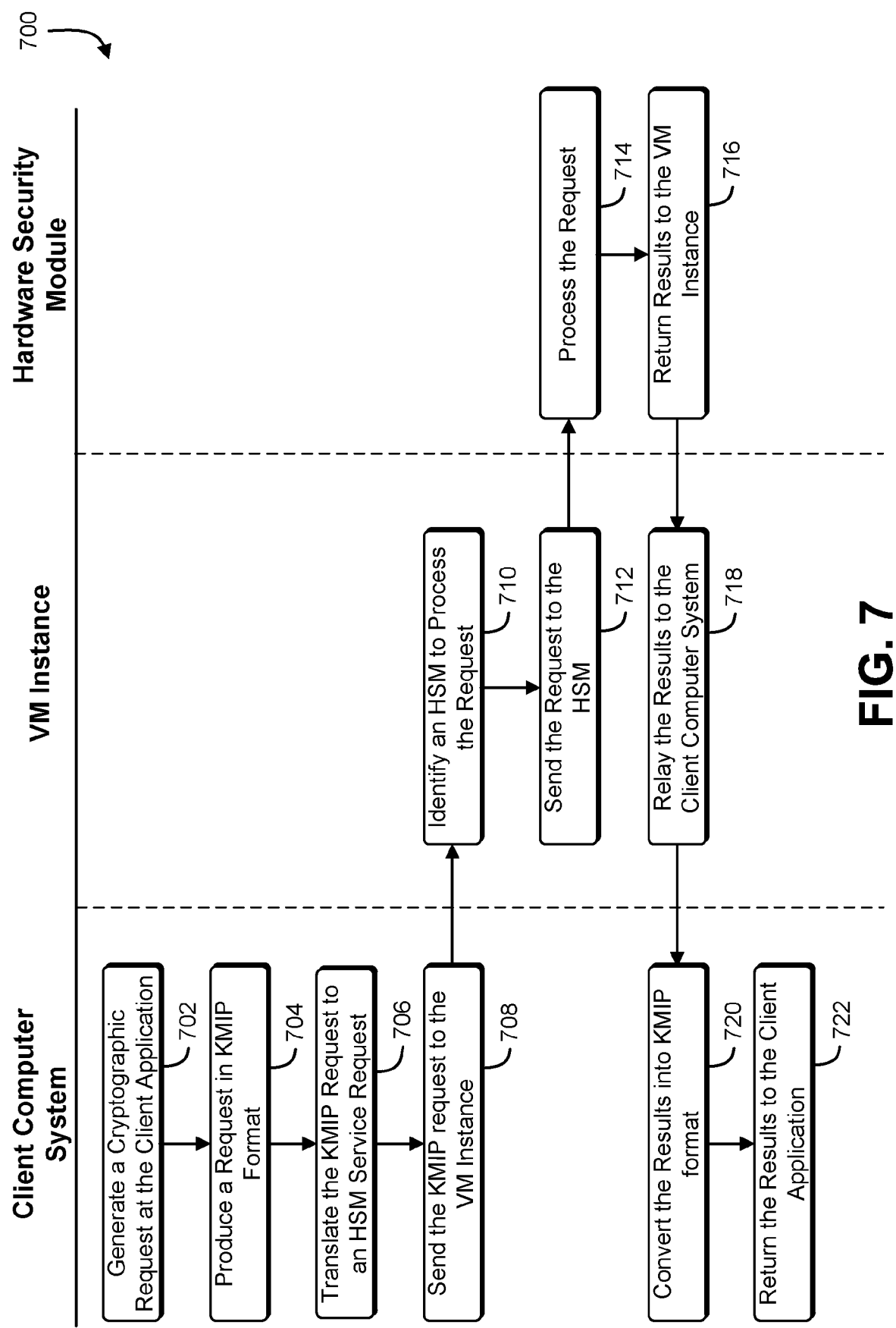
FIG. 7 illustrates a process that, as a result of being performed by a client computer system, a VM instance, and an HSM Cluster, fulfills a cryptographic request generated by a customer application.

FIG. 7 illustrates a process 700 that, as a result of being performed by a client computer system, a VM instance, and an HSM Cluster, fulfills a cryptographic request generated by a customer application. In an embodiment, the process begins at block 702 with a client computer system generating a cryptographic request at the client application. In an embodiment, the cryptographic request is an encryption operation, a decryption operation, a signature generation operation, a signature verification operation, a key generation operation, a key rotation operation, or a key deletion operation. In an embodiment, at block 704, the client computer system formats the request in accordance with the KMIP protocol. In an embodiment, the formatting of the cryptographic request is accomplished by a driver that converts a call to a procedural application programming interface to a request in accordance with the KMIP protocol. In an embodiment, at block 706, the client computer system translates the request from the KMIP protocol into one that is compatible with the HSM cluster. In an embodiment, the translation converts the request using a translation table. In an embodiment, the translation table includes information that describes equivalent commands and parameter mappings for each command. In an embodiment, at block 708, the request is transmitted to the VM Instance.

In an embodiment, at block 710, the VM instance receives the translated request from the client computer system, and identifies an HSM for processing the request. In an embodiment, the HSM may be identified based on its availability for processing, the presence of particular cryptographic keys in the HSM used to process the request, or a particular capability of the HSM used as part of the cryptographic operation. In an embodiment, at block 712, the VM instance sends the request to the identified HSM. In an embodiment, credentials are provided in addition to the request to authorize access to the HSM.

In an embodiment, at block 714, the hardware security module receives the request from the VM instance, and processes the request. In an embodiment, the request is authorized using credentials provided with the request. In an embodiment, the HSM produces a set of results which, at block 716, are returned to the VM instance. For example, in an embodiment, the request is an encryption request, and the hardware security module returns a ciphertext to the VM instance. In another example, in an embodiment, the request is a decryption request, and the hardware security module returns the plaintext to the VM instance.

In an embodiment, at block 718, the VM instance receives the results from the hardware security module, and relays the results to the client computer system. In an embodiment, at block 720, the client computer system receives the results of the request from the VM instance, and converts the results into a format that is compatible with the KMIP request. In an embodiment, converting the results may involve modifying the format, ordering, and transmission characteristics of the results. In an embodiment, at block 722, the results are relayed to the client application.

Figure 8:
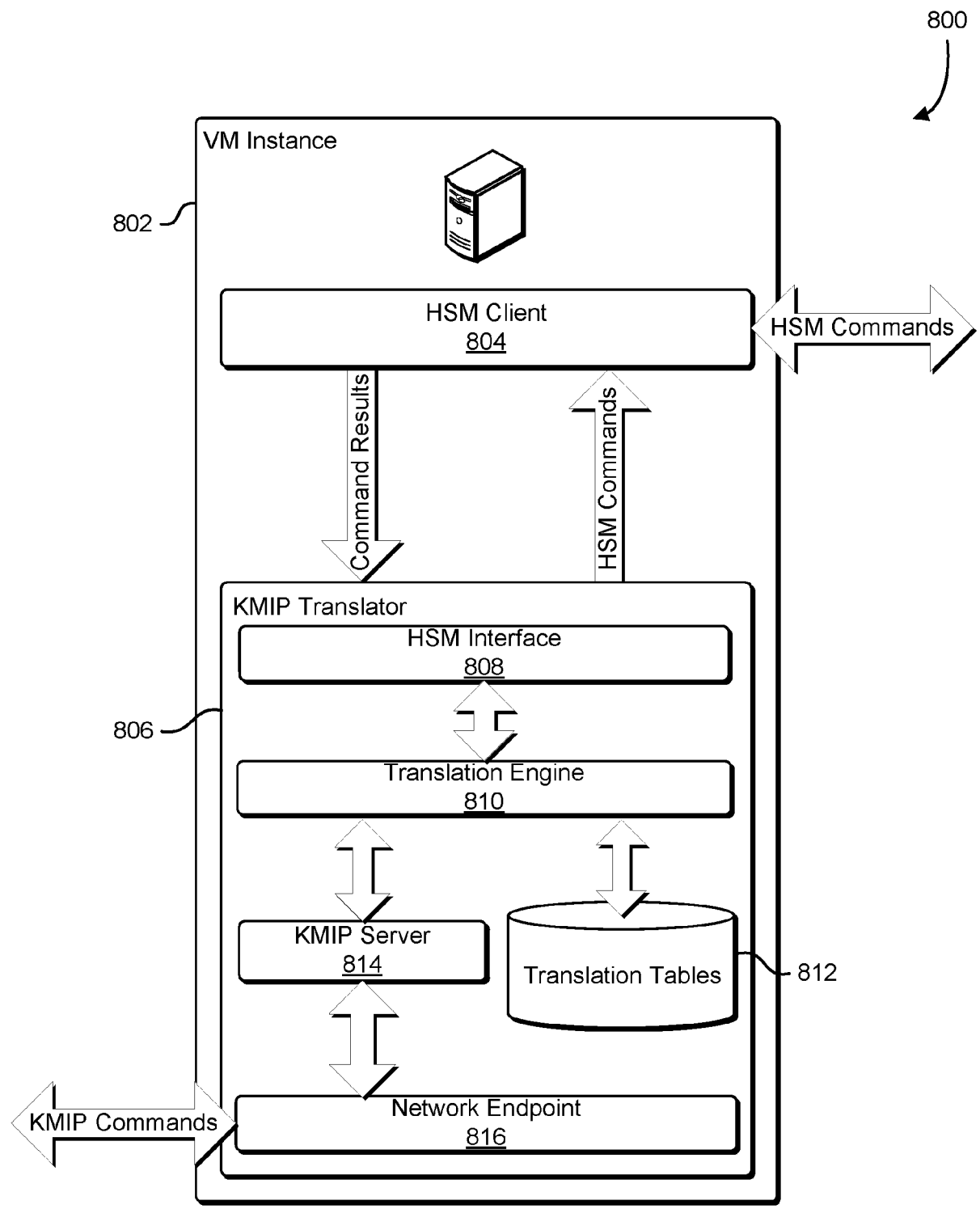
FIG. 8 illustrates an example of a KMIP translator hosted on a VM instance, in an embodiment.

FIG. 8 illustrates an example of a KMIP translator hosted on a VM instance 800, in an embodiment. In an embodiment, a VM instance 802 hosts an HSM client 804 and a KMIP translator 806. In an embodiment, the VM instance routes requests to perform cryptographic operations between the customer application and a set of HSMs arranged in a cluster configuration. In an embodiment, the VM instance 802 may be replaced by a computer system, a computer server, a server cluster, a container runtime, or serverless execution platform. In an embodiment, a serverless execution platform (such as Amazon Web Services ("AWS") Lambda) is a service provided by a computing resource service provider that allocates computing resources for the execution of executable instructions as a result of receiving a request to execute the instructions. In an embodiment, the particular computing resource is allocated are not dedicated to the executable instructions when the executable instructions are not running. In an embodiment, the serverless execution platform provides scalable on-demand computing resources for the execution of user code without dedicating those resources when the instructions are not executing. In an embodiment, the HSM client 804 receives requests to perform cryptographic operations from the KMIP translator 806, selects a particular HSM from the set of HSMs to fulfill the request, and submits the request to the selected HSM. In an embodiment, the HSM fulfills the request and returns any results to the HSM client 804. In an embodiment, upon receiving the results from the HSM, the HSM client 804 routes the results back to the KMIP translator 806. In an embodiment, the HSM client 804 includes information with the results that allows the KMIP translator 806 to return the results to the appropriate requester. In an embodiment, the HSM client 804 includes load-balancing functionality that selects a particular HSM from a set of HSMs to distribute cryptographic processing loads across the set of HSMs.

In an embodiment, the KMIP translator 806 includes an HSM interface 808, a translation engine 810, a set of translation tables 812, a KMIP server 814, and a network endpoint 816. In an embodiment, the network endpoint binds to a network port and listens for incoming cryptographic requests from client applications. In an embodiment, the network endpoint may be a procedural API or a message-based API. In an embodiment, when the network endpoint 816 receives a request from a customer application, the request is forwarded to the KMIP server 814. In an embodiment, the KMIP server 814 authenticates the requester, records information that identifies the connection over which the request was submitted, and maintains the connection in an open state while waiting for the results of the request. In an embodiment, the request is forwarded to the translation engine 810 which examines the request, and queries the set of translation tables 812 to locate a translation entry that matches the request type of the incoming request. In an embodiment, the translation entry provides a dictionary that translates the incoming KMIP request into one that is compatible with the set of HSMs. In an embodiment, the translation entry includes a parameter mapping information that allows the translation engine 810 to reorder and reformat any parameters included with the request so that the outgoing parameters are compatible with what is expected by the HSM. In an embodiment, the translated request is forwarded to the HSM interface 808 which forwards the request to the HSM client 804.

In an embodiment, as described above, the HSM client submits the translated request to the HSMs and receives a set of results which are returned to the HSM interface 808. In an embodiment, the results are routed through the translation engine 810 which uses the information in the translation entry to convert the results into a format that is compatible with the KMIP protocol. In an embodiment, the results are provided to the KMIP server 814, which returns the results to the caller over the same connection used to submit the request, and the connection may then be closed. In an embodiment, KMIP server 814 generates a tag for each incoming request, and the tag is maintained with the request as it is submitted to the HSM and is returned with any results, thereby allowing the KMIP server 814 to match the returned results with the incoming connection of the associated request.

Figure 9:
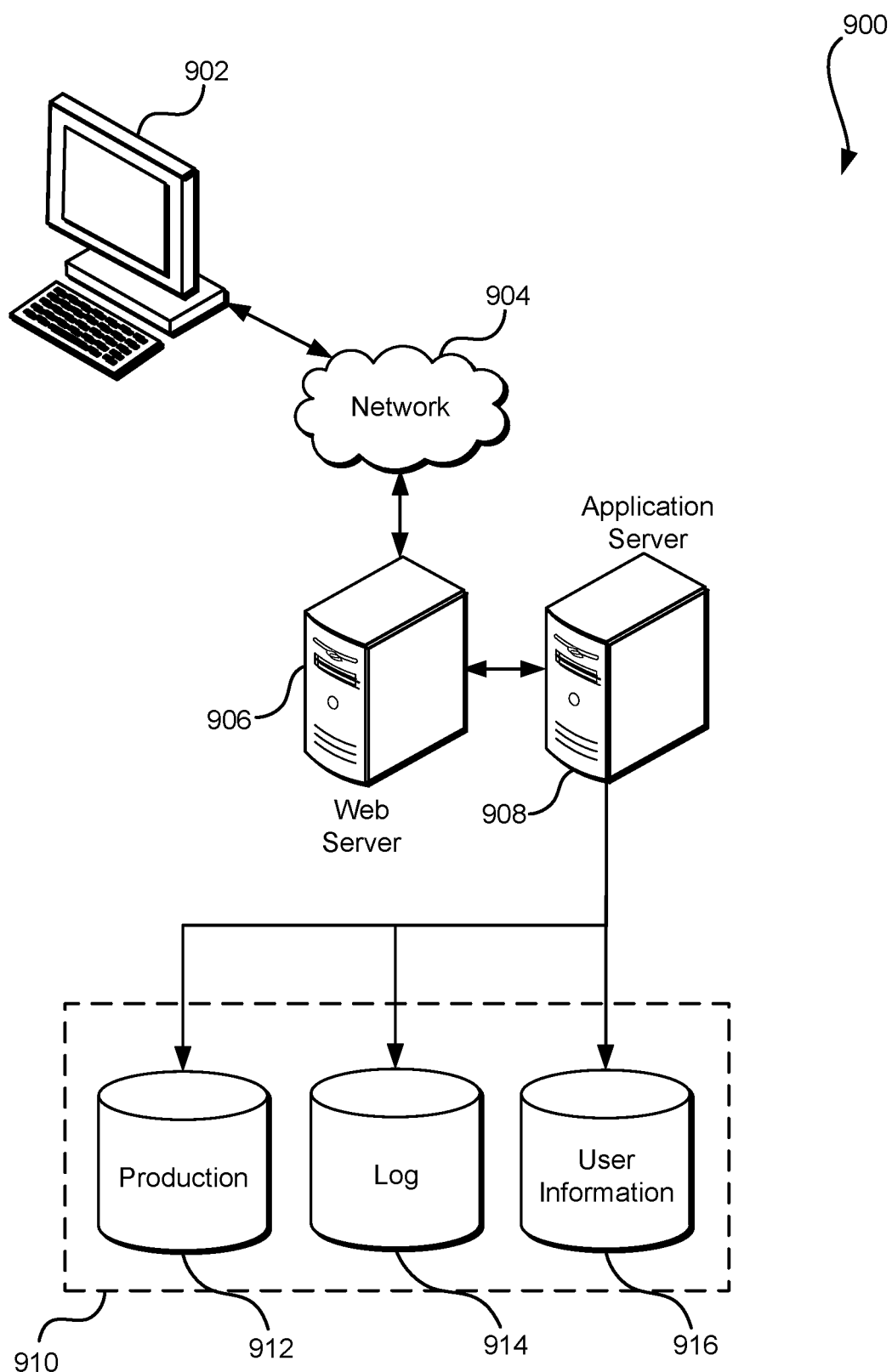
FIG. 9 illustrates a system in which various embodiments can be implemented.

FIG. 9 illustrates aspects of an example system 900 for implementing aspects in accordance with an embodiment. As will be appreciated, although a web-based system is used for purposes of explanation, different systems may be used, as appropriate, to implement various embodiments. In an embodiment, the system includes an electronic client device 902, which includes any appropriate device operable to send and/or receive requests, messages, or information over an appropriate network 904 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network, and/or combination thereof and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly-addressable communications network, as the system includes a web server 906 for receiving requests and serving content in response thereto, although for other networks an alternative device serving a similar purpose could be used as would be apparent to one of ordinary skill in the art.

In an embodiment, the illustrative system includes at least one application server 908 and a data store 910 and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including, but not limited to, text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including, but not limited to, forms that are perceptible to the user audibly, visually and/or through other senses. The handling of all requests and responses, as well as the delivery of content between the client device 902 and the application server 908, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 910, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 912 and user information 916, which are used to serve content for the production side. The data store also is shown to include a mechanism for storing log data 914, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 910.

The data store 910, in an embodiment, is operable, through logic associated therewith, to receive instructions from the application server 908 and obtain, update or otherwise process data in response thereto and the application server 908 provides static, dynamic, or a combination of static and dynamic data in response to the received instructions. In an embodiment, dynamic data, such as data used in web logs (blogs), shopping applications, news services, and other such applications are generated by server-side structured languages as described herein or are provided by a content management system ("CMS") operating on, or under the control of, the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the client device 902. Continuing with example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 900 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed (i.e., as a result of being executed) by a processor of the server, cause or otherwise allow the server to perform its intended functions.

The system 900, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols and such a system also includes a number of workstations running any of a variety of commercially-available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that run one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above which can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

For example, cryptographic algorithms include block ciphers and the various modes that utilize initialization vectors, such as the cipher-block chaining (CBC) mode, propagating cipher-block chaining (PCBC) mode, cipher feedback mode (CFB), output feedback (OFB) mode, counter (CTR) mode, and other modes, such as authenticated encryption modes such as eXtended Ciphertext Block Chaining (XCBC) mode, Integrity Aware CBC (IACBC) mode, Integrity Aware Parallelizable (IAPM) mode, Offset Codebook (OCB) mode, EAX and EAX Prime modes, Carter-Wegman + CTR (CWC) mode, Counter with CBC-MAC (CCM) mode, Galois/Counter (GCM) mode.

As discussed, numerous variations utilize symmetric and/or asymmetric cryptographic primitives. Symmetric key algorithms may include various schemes for performing cryptographic operations on data including block ciphers, stream ciphers and digital signature schemes. Example symmetric key algorithms include the advanced encryption standard (AES), the data encryption standard (DES), triple DES (3DES), Serpent, Twofish, blowfish, CAST5, RC4 and the international data encryption algorithm (IDEA). Symmetric key algorithms may also include those used to generate output of one way functions and include algorithms that utilize hash-based message authentication codes (HMACs), message authentication codes (MACs) in general, PBKDF2 and Bcrypt. Asymmetric key algorithms may also include various schemes for performing cryptographic operations on data. Example algorithms include those that utilize the Diffie-Hellman key exchange protocol, the digital signature standard (DSS), the digital signature algorithm, the ElGamal algorithm, various elliptic curve algorithms, password-authenticated key agreement techniques, the pallier cryptosystem, the RSA encryption algorithm (PKCS#1), the Cramer-Shoup cryptosystem, the YAK authenticated key agreement protocol, the NTRUEncrypt cryptosystem, the McEliece cryptosystem, and others. Elliptic curve algorithms include the elliptic curve Diffie-Hellman (ECDH) key agreement scheme, the Elliptic Curve Integrated Encryption Scheme (ECIES), the Elliptic Curve Digital Signature Algorithm (ECDSA), the ECMQV key agreement scheme and the ECQV implicit certificate scheme. Other algorithms and combinations of algorithms are also considered as being within the scope of the present disclosure and the above is not intended to be an exhaustive list.

Note that the term "digital signature" includes any information usable to cryptographically verify authenticity of a message including information generated using an RSA-based digital scheme (such as RSA-PSS), the digital signature algorithm (DSA) and the elliptic curve digital signature algorithm, the ElGamal signature scheme, the Schnorr signature scheme, the Pointcheval-Stern signature algorithm, the Rabin signature algorithm, pairing-based digital signature schemes (such as the Boneh-Lynn-Schacham signature scheme), undeniable digital signature schemes, and others. Further, message authentication codes (such as hash-based message authentication codes (HMACs), keyed cryptographic hash functions, and other types of information may also be used as digital signatures.

In various embodiments, data objects such as digital signatures may be cryptographically verifiable. In one example, cryptographically verifiable data objects are created to be cryptographically verifiable by the system to which the data object is to be provided or another system that operates in conjunction with the system to which the data object is to be provided. For example, the data object may be encrypted so as to be decryptable by the system that will cryptographically verify the data object, where the ability to decrypt the data object serves as cryptographic verification of the data object. As another example, the data object may be digitally signed (thereby producing a digital signature of the data object) such that the digital signature is verifiable by the system that will cryptographically verify the data object. In other examples, both encryption and digital signatures are used for cryptographic verifiability and/or security. The key used to encrypt and/or digitally sign the data object may vary in accordance with various embodiments and the same key is not necessarily used for both encryption and digital signing, where applicable. In some embodiments, a key used to encrypt the data object is a public key of a public/private key pair where the private key of the key pair is maintained securely by the system to which the data object is to be provided, thereby enabling the system to decrypt the data object using the private key of the key pair. Using the public key to encrypt the data object may include generating a symmetric key, using the symmetric key to encrypt the data object, and encrypting the symmetric key using the public key, where the encrypted symmetric key is provided to a system with the encrypted data object to enable the system to use the corresponding private key to decrypt the symmetric key and use the decrypted symmetric key to decrypt the data object. Further, in some embodiments, the data object is digitally signed using a private key of a public/private key pair corresponding to the computer system that encrypts and/or digitally signs the data object (e.g., a user device). For example, an application may be provisioned with the private key and the data object may include a certificate for the private key for use by a system for verification of the digital signature of the data object. Other variations, including variations where a symmetric key shared between the user computer and the system that cryptographically verifies the data object can be used to encrypt and/or digitally sign the data object.

Information may be said to be programmatically unexportable if there is no legitimate way to programmatically cause (e.g., through an interface of the device) the device to provide the information). The information may be maintained, for example, such that there is no request mechanism (e.g., application programming interface (API) call) for causing hardware, with access to the information in plaintext form, to reveal the information in plaintext form. As an example, a device storing the information (e.g., cryptographic module) may be configured to lack an ability to provide a copy of some or all of its memory such that the copy includes the information in plaintext form. It should be noted however, that while information for which there is no legitimate way of obtaining the information in plaintext form is used throughout the disclosure for the purpose of illustration, some information may be maintained such that the information is obtainable through a limited number of authorized uses, which may require various security protocols to be employed and able to prevent unauthorized access to the information in plaintext form. Generally, programmatically unexportable information is information (e.g., one or more cryptographic keys) for which extraordinary measures must be taken to obtain the information in plaintext form, if it is possible at all to obtain the information in plaintext form.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood with the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors — for example, a non-transitory computer-readable storage medium store instructions and a main CPU execute some of the instructions while a graphics processor unit executes other instructions. In an embodiment, different components of a computer system have separate processors and different processors execute different subsets of the instructions.

Accordingly, in an embodiment, computer systems are configured to implement one or more services that singly or collectively perform operations of processes described herein and such computer systems are configured with applicable hardware and/or software that enable the performance of the operations. Further, a computer system that implement an embodiment of the present disclosure is a single device and, in another embodiment, is a distributed computer systems comprising multiple devices that operate differently such that the distributed computer system performs the operations described herein and such that a single device does not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   obtaining, at a virtual machine instance, from an application, a first request to perform a cryptographic operation, wherein the first request is obtained in accordance with a first protocol unsupported by a first hardware security module;
   determining a translation table from a set of translation tables based at least in part on the first request, wherein the set of translation tables comprise translation tables corresponding to different protocols;
   translating, at the virtual machine instance using the translation table, the first request to produce a second request to perform the cryptographic operation in accordance with a second protocol supported by the first hardware security module, wherein the translation table indicates a correspondence of the cryptographic operation in the first protocol to the cryptographic operation in the second protocol;
   generating a tag associated with the second request, such that individual requests originating with a requester have different tags;
   transmitting the second request with the tag to the first hardware security module to cause the first hardware security module to perform the cryptographic operation and provide a result of the cryptographic operation with the tag based at least in part on determining that the cryptographic operation is completed before a timeout occurs, wherein occurrence of the timeout causes the second request to be provided to a second hardware security module;
   associating the result to the second request using the tag;
   translating the result of the cryptographic operation from the second protocol to the first protocol; and
   transmitting the translated result to the application based at least in part on the tag.

2. The computer-implemented method of claim 1, further comprising selecting the first hardware security module from a plurality of hardware security modules arranged in a cluster, each hardware security module of the plurality of hardware security modules storing a cryptographic key that allows the second request to be fulfilled.

3. The computer-implemented method of claim 1, wherein the first protocol is a key management interoperability protocol.

4. The computer-implemented method of claim 1, further comprising:
   obtaining, at the virtual machine instance, results of the second request;
   generating results of the first request based at least in part on the results of the second request; and
   providing results of the first request to the application.

5. A computer system, comprising:
one or more processors; and
memory storing computer-executable instructions that, as a result of being executed by the one or more processors, cause the computer system to:
 obtain, from an application, a first request to perform a cryptographic operation, wherein the first request is in accordance with a first protocol;
 determine, based at least in part on the first protocol, a translation table from a set of translation tables that include different translation tables in accordance with different protocols;
 cause a virtual machine instance to generate, based at least in part on the translation table, a second request to perform the cryptographic operation, wherein the second request is in accordance with a second protocol supported by a cryptographic device;
 generate a tag associated with the second request, the tag different from other tags associated with other requests generated by the application; and
 transmit the second request and the tag to the cryptographic device to cause the cryptographic device to perform the cryptographic operation and return the tag with a result of performing the cryptographic operation based at least in part on determining that the cryptographic operation is completed before a timeout, wherein the timeout causes an additional cryptographic device to receive the second request.

6. The computer system of claim 5, wherein the computer-executable instructions further cause the computer system to select the cryptographic device from a plurality of cryptographic devices, the plurality of cryptographic devices synchronized with a set of cryptographic keys.

7. The computer system of claim 6, wherein the cryptographic device is selected based at least in part on available processing power of individual cryptographic devices of the plurality of cryptographic devices.

8. The computer system of claim 6, wherein the computer-executable instructions further cause the computer system to:
 identify the first protocol based at least in part on the first request;
 acquire, from the translation table, information based at least in part on the first protocol that allows the first request to be translated into an equivalent request in the second protocol; and
 use the information to translate the first request into the second request.

9. The computer system of claim 5, wherein:
the application is hosted on the computer system;
the second request is generated by a translation service on the computer system; and
the second request is transmitted to the cryptographic device by a hardware security module client on the computer system.

10. The computer system of claim 5, wherein:
the application is hosted on a second computer system; and
the first request is transmitted from the second computer system to the computer system via a computer network.

11. The computer system of claim 5, wherein the computer system is a virtual computer system instance, container runtime, or serverless computing platform.

12. The computer system of claim 5, wherein the computer-executable instructions further cause the computer system to:
 obtain, from the application, a third request to perform a cryptographic operation, wherein the third request is in accordance with the second protocol; and
 transmit the third request to the cryptographic device to cause the cryptographic operation to be performed.

13. A non-transitory computer-readable storage medium storing thereon executable instructions that, as a result of being executed by one or more processors of a computer system, cause the computer system to at least:
 obtain, from an application, a first request to perform a cryptographic operation, wherein the first request is in accordance with a first protocol;
 determine a translation table among a set of translation tables corresponding to different protocols;
 cause a virtual machine to generate, based at least in part on the translation table, a second request to perform the cryptographic operation, the second request generated in accordance with a second protocol supported by a first cryptographic device;
 associate a tag associated with the second request, individual requests associated with a requester having unique tags; and
 transmit the second request and the tag to the first cryptographic device to cause the first cryptographic device to perform the cryptographic operation and return the tag with a result of performing the cryptographic operation based at least in part on determining that the cryptographic operation is completed prior to a timeout, wherein exceeding the timeout causes the cryptographic operation to be performed by a second cryptographic device.

14. The non-transitory computer-readable storage medium of claim 13, wherein the executable instructions further comprise instructions that, as a result of being executed by the one or more processors, cause the computer system to select the first cryptographic device from a cluster of cryptographic devices, each cryptographic device in the cluster of cryptographic devices storing a set of cryptographic keys.

15. The non-transitory computer-readable storage medium of claim 14, wherein the second cryptographic device supports the second protocol.

16. The non-transitory computer-readable storage medium of claim 13, wherein the executable instructions further include instructions that cause the computer system to:
 identify the first protocol based at least in part on a communication channel over which the first request is obtained;
 acquire, from the translation table, information based at least in part on the first protocol that allows the first request to be translated into an equivalent request in the second protocol; and
 use the information to translate the first request into the second request.

17. The non-transitory computer-readable storage medium of claim 13, wherein the executable instructions further include instructions that cause the computer system to:
 obtain, from an application, a third request to perform a cryptographic operation, wherein the third request is in accordance with a third protocol different than the first protocol;
 generate a fourth request to perform the cryptographic operation, wherein the fourth request is in accordance with the second protocol supported by the first cryptographic device; and
 transmit the fourth request to the first cryptographic device to cause the cryptographic operation to be performed.

18. The non-transitory computer-readable storage medium of claim 13, wherein the instructions that cause the computer system to generate the second request further include instructions that cause the computer system to:
 map a first command specified of the first request to a second command in the second request based at least in part on information included in the translation table; and map a first parameter of the first request to a second parameter in the second request based at least in part on the information included in the translation table.

19. The non-transitory computer-readable storage medium of claim 13, wherein the computer system is a virtual machine instance, container runtime, or a serverless execution platform.

20. The non-transitory computer-readable storage medium of claim 13, wherein the first cryptographic device is a hardware security module, trusted platform module, or a cryptoprocessor.

\* \* \* \* \*